United States Patent
Sata et al.

(10) Patent No.: US 12,009,521 B2
(45) Date of Patent: Jun. 11, 2024

(54) NEGATIVE ELECTRODE FOR BATTERIES, BATTERY, AND METHOD FOR PRODUCING BATTERY

(71) Applicant: SHARP KABUSHIKI KAISHA, Sakai (JP)

(72) Inventors: Shunsuke Sata, Sakai (JP); Hirotaka Mizuhata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 266 days.

(21) Appl. No.: 16/757,241

(22) PCT Filed: Oct. 24, 2018

(86) PCT No.: PCT/JP2018/039443
§ 371 (c)(1),
(2) Date: Apr. 17, 2020

(87) PCT Pub. No.: WO2019/093125
PCT Pub. Date: May 16, 2019

(65) Prior Publication Data
US 2021/0135223 A1   May 6, 2021

(30) Foreign Application Priority Data
Nov. 8, 2017   (JP) ................. 2017-215808

(51) Int. Cl.
*H01M 4/62*   (2006.01)
*H01M 4/02*   (2006.01)
*H01M 4/134*  (2010.01)
*H01M 4/1395* (2010.01)
*H01M 4/24*   (2006.01)
*H01M 4/36*   (2006.01)
*H01M 4/38*   (2006.01)
*H01M 12/08*  (2006.01)

(52) U.S. Cl.
CPC ............. *H01M 4/62* (2013.01); *H01M 4/134* (2013.01); *H01M 4/1395* (2013.01); *H01M 4/366* (2013.01); *H01M 4/38* (2013.01); *H01M 12/08* (2013.01); *H01M 2004/021* (2013.01); *H01M 2004/027* (2013.01)

(58) Field of Classification Search
None
See application file for complete search history.

(56) References Cited

FOREIGN PATENT DOCUMENTS

| | | | |
|---|---|---|---|
| CN | 102447100 A | | 5/2012 |
| JP | 2011204571 A | | 10/2011 |
| JP | 2015-170390 A | | 9/2015 |
| JP | 2015170390 A | * | 9/2015 |
| JP | 2015-197976 A | | 11/2015 |
| JP | 2015197976 A | * | 11/2015 |

* cited by examiner

*Primary Examiner* — Tracy M Dove
(74) *Attorney, Agent, or Firm* — ScienBiziP, P.C.

(57) ABSTRACT

An active material layer of a metal negative electrode includes: active material particles including a negative active material; and an additive having particles larger in average particle size than the active material particles. The metal negative electrode is immersed in an alkaline aqueous solution, and the additive is eluted into the alkaline aqueous solution. In a place where the additive is previously found, a space is defined in the active material layer.

7 Claims, 4 Drawing Sheets

NEGATIVE ELECTRODE FOR BATTERIES, BATTERY, AND METHOD FOR PRODUCING BATTERY

TECHNICAL FIELD

The present disclosure relates to a negative electrode for batteries, a battery, and a method for producing the battery. The negative electrode includes such a metal as zinc as a negative active material.

BACKGROUND ART

A negative electrode for batteries, which is used for a zinc-air battery, includes: an active material layer; and a current collector provided in the center of the active material. The active material layer is a mixture of such materials as a negative active material, a conductive material, and a binder. Voids are formed between the materials. When the battery operates, the voids formed in the active material are filled with an electrolytic solution to act as conductive paths for OH-ions required for the cell reaction.

In order to provide a zinc-air battery with high capacity, a required measure is to make the active material layer thick or to fill the active material layer with the negative active material in high density to increase the electrode density of the active material layer, or to take both of the measures. However, if the active material layer is formed thick and the electrode density is increased to an excessive degree, the measures cause such problems as a lower power generation performance, a decrease in coulombic efficiency, and a shorter cycle life of the zinc-air battery.

Specifically, the electrolytic solution in a zinc-air battery penetrates from a surface and a periphery of the active material layer toward its center (near the current collector). If the active material layer is formed thick, the electrolytic solution is less likely to penetrate and fails to wet some part of the center of the active material layer. This non-wet part causes current crowding inside the active material layer to create passivation. The passivation results in a decrease in coulombic efficiency and a deterioration in battery property. Moreover, higher electrode density of the active material layer reduces voids inside the active material layer and decreases the conductive paths for the ions required for the cell reaction. As a result, ion resistivity increases, deteriorating the battery property.

Patent Document 1 discloses that nanoparticles of such substances as aluminum oxide, calcium oxide, aluminum hydroxide, and calcium hydroxide ranging from 0.01 mass % to 60 mass % per 100 mass % of zinc electrode compound are uniformly dispersed in the active material layer in order to improve rate characteristics and charge-discharge cycle characteristics.

Moreover, Patent Document 2 discloses a compound containing aluminum oxide and aluminum hydroxide whose isoelectric point is higher than 7. The compound, ranging from 0.05 mass % to 30 mass % per 100 mass % of battery negative electrode composition, is included in an active material layer in order to keep a negative electrode for the battery from deforming.

CITATION LIST

Patent Literature

[Patent Document 1] Japanese Unexamined Patent Application Publication No. 2015-197976

[Patent Document 2] Japanese Unexamined Patent Application Publication No. 2015-170390

SUMMARY OF INVENTION

Technical Problem

Patent Documents 1 and 2 disclose improvements in various characteristics of batteries because the active material layers include aluminum oxide and calcium oxide. However, neither of the patent documents study a problem of the active material layers becoming greater in thickness and higher in density along with an increase in the capacity of the batteries; that is, a problem of reduction in conductive paths for ions. Hence, the patent documents fail to disclose a configuration to overcome the problem.

The present disclosure is conceived in view of the above problem, and intends to provide a negative electrode for batteries, a battery, and a method for producing the battery capable of defining an ion conductive path inside an active material layer and of forming the active material layer thicker and higher in density along with an increase in the capacity of the battery.

Solution to Problem

In order to solve the above problem, an aspect of the present disclosure relates to a negative electrode, for a battery, including metal as a negative active material. The negative electrode includes: an active material layer formed to include active material particles and an additive, the active material particles including the negative active material, and the additive (i) having particles larger in average particle size than the active material particles and (ii) made of a compound including an element in a second family of a periodic table among elements acting as basic oxides; and/or a compound including an element in a thirteenth family of the periodic table among elements acting as amphoteric oxides, wherein the additive included ranges from 0.01 parts by mass to 2.8 parts by mass inclusive per 100 parts by mass of the active material particles.

Thanks to the above features, in a battery including the negative electrode, the additive is eluted into the electrolytic solution. Hence, in the place where the additive is previously found, a space is defined. This space acts as a conductive path for ions to be required for cell reaction, contributing to form the active material layer thicker and higher in density to obtain a higher capacity for the battery.

SUMMARY OF INVENTION

In a negative electrode for batteries, a battery, and a method for producing the battery of the present disclosure, an additive is eluted in the electrolytic solution in the negative electrode. Such a feature makes it possible to define a space where the additive is previously found. This space acts as a conductive path for ions to be required for cell reaction, achieving advantageous effects of forming the active material layer thicker and higher in density to obtain a higher capacity for the battery.

BRIEF DESCRIPTION OF DRAWINGS

FIG. 1 schematically illustrates a configuration of a metal negative electrode according to a first embodiment.

FIG. 2 conceptually illustrates an enlarged configuration of an active material layer of the metal negative electrode.

DESCRIPTION OF EMBODIMENTS

First Embodiment

Described below in detail are embodiments of the present disclosure with reference to the drawings.

Figure 1A:
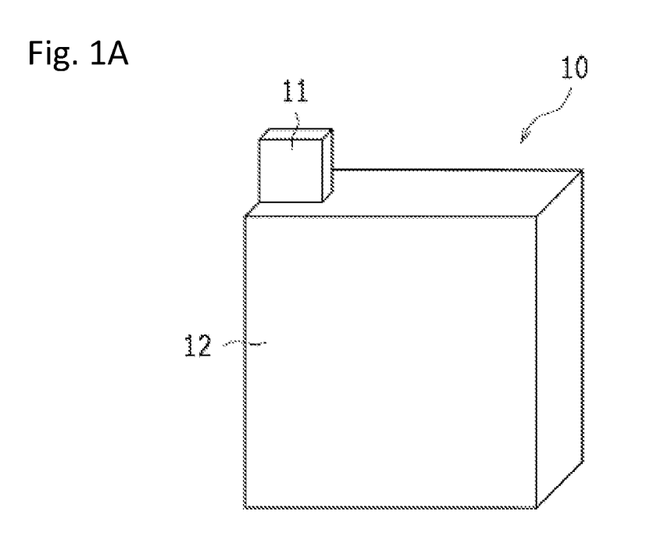
FIG. 1A illustrates a perspective view.
Figure 1B:
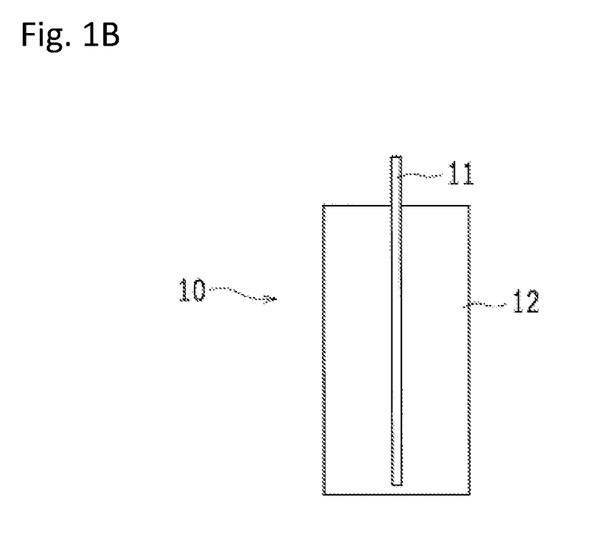
FIG. 1B illustrates a cross-sectional view.

FIG. 1 schematically illustrates a configuration of a metal negative electrode (a battery electrode) 10 according to a first embodiment. FIG. 1A illustrates a perspective view, and FIG. 1B illustrates a cross-sectional view. As illustrated FIG. 1, the metal negative electrode 10 includes a current collector 11 and an active material layer 12 provided on both sides of the current collector 11. The current collector 11 is provided in the center along a thickness of the active material layer 12, so that, when the metal negative electrode 10 is used for a battery, the metal negative electrode 10 and a positive electrode of the battery are kept separated at a certain distance.

The current collector 11 sends and receives electrons between the active material layer 12 and a not-shown battery terminal. Examples of materials of the current collector 11 include copper, a copper alloy such as brass, and such materials as nickel, zinc, steel, and a nonwoven fabric plated with, for example, tin and bismuth. The current collector 11 can be formed of a foil sheet and a flat plate, and include any given number and size of through holes penetrating the face of the current collector 11. Preferably, the current collector 11 has an aperture ratio of 5% to 80%. The through holes of the current collector 11 may be opened by punching, etching, and expanding. The through holes may also be meshes. Moreover, the current collector 11 may be a foam article including the above materials. Preferably, the current collector 11 has a thickness ranging from 8 μm to 200 μm, and more preferably ranging from 50 μm to 100 μm. The thickness of the current collector 11 may be measured by any known technique.

Figure 2A:
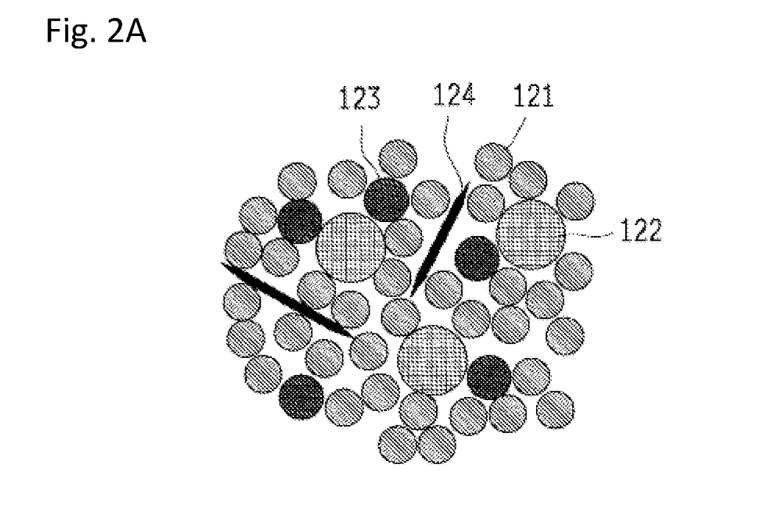
FIG. 2A illustrates a state before an eluting step.
Figure 2B:
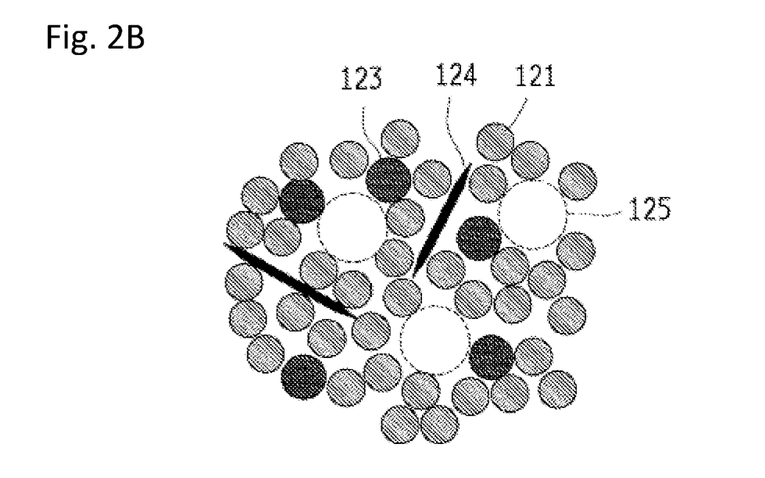
FIG. 2B illustrates a state after the eluding step.

FIG. 2 conceptually illustrates an enlarged configuration of the active material layer 12 of the metal negative electrode 10. FIG. 2A illustrates a state of the active material layer 12 before an eluting step which involves immersing the metal negative electrode 10 in an alkaline aqueous solution. FIG. 2B illustrates a state of the active material layer 12 after the eluding step. When shipped in the form of a battery component, the metal negative electrode 10 may be shipped in the state before the eluting step illustrated in FIG. 2A.

The active material layer 12 of the metal negative electrode 10 before the eluting step may include at least active material particles 121 and an additive 122. The active material layer 12 may further include a conductive material 123 and a binder 124.

The active material particles 121 are made of a compound containing an element (a metallic element such as zinc, magnesium, aluminum, iron, and copper) acting as a negative active material. In the case where the metal negative electrode 10 is used for, for example, a zinc-air battery, the active material particles 121 may be a zinc-containing compound to be used as an active material. Preferably, zinc, zinc oxide, and atomized zinc may be used as the active material particles 121. Furthermore, the active material particles 121 have an average particle size ranging from 10 nm to 10 μm inclusive. If the average particle size of the active material particles 121 is larger than 1 μm, oxidization-reduction reaction does not progress to the inside of the active material particles 121. Accordingly, the active material particles 121 might have an increasing portion not contributing to the oxidization-reduction reaction.

In the metal negative electrode 10 before the eluting step illustrated in FIG. 2A, the additive 122 is found in the active material layer 12 in the form of particles. Meanwhile, in the metal negative electrode 10 after the eluting step illustrated in FIG. 2B, the additive 122 is eluded with an alkaline aqueous solution, and, in the place where the additive 122 is previously found, a space 125 is defined. Kinds of the solution and the materials of the additive 122 to be selected do not affect other components (the active material particles 121, the conductive material 123, and the binder 124) when the additive 122 is eluted. The kinds will be described later in detail. Moreover, the additive 122 is larger in average particle size than the active material particles 121. Preferably, the average particle size of the additive 122 ranges from 10 μm to 100 μm inclusive. Furthermore, preferably, the additive 122 is a mixture of a first additive and a second additive each having a different average particle size. Two additives each having a different average particle size are used as the additive 122, so that after the additive 122 is eluted, the paths through which the electrolytic solution penetrates in the active material layer 12 can be divided further and finer. Specifically, the first additive has an average particle size ranging preferably from 30 μm to 100 μm, and the second additive has an average particle size ranging preferably from 10 μm to 30 μm. Moreover, preferably, the additive 122 are larger in average particle size than the conductive material 123. Specifically, the conductive material 123 has an average particle size ranging preferably from 0.1 nm to 10 μm inclusive, and more preferably from 0.5 nm to 8 μm inclusive. Furthermore, the additive 122 contained in the active material layer 12 ranges preferably from 0.01 parts by mass to 2.8 parts by mass inclusive per 100 parts by mass of the active material particles 121. The additive 122 contained in the active material layer 12 ranges more preferably from 0.1 parts by mass to 2.0 parts by mass inclusive per 100 parts by mass of the active material particles 121. If the additive 122 contained is less than 0.01 parts by mass per 100 parts by mass of the active material particles 121, the active material layer 12 is not provided with an appropriate space. Accordingly, an expected advantageous effect might not be obtained. Meanwhile, if the additive 122 contained is more than 2.8 parts by mass per 100 parts by mass of the active material particles 121, the space in the active material becomes excessively large. Accordingly, electron conductivity might be deteriorated. In FIG. 2B, all the additive 122 is eluted so that the space 125 is defined. Alternatively, after the elution, the additive 122 may partially remain in the active material layer 12.

The conductive material 123 is added to enhance the electron conductivity of the active material layer 12. The conductive material 123 is a compound to include an element whose exchange current density $i_o$ is $10^{-9}$ A/cm$^2$ or less. In the case where the metal negative electrode 10 is used for, for example, a zinc-air battery, and the compound acting as the conductive material 123 is an oxide, the difference in oxidization-reduction potential between the element and zinc causes the element to be reduced to a metal during charge. Hence, the reduced metal acts as a conductive material. Moreover, an element whose exchange current density $i_o$ is $10^{-9}$ A/cm$^2$ or less is high in hydrogen overvoltage. Using such an element for the conductive material 123 achieves an advantageous effect of reducing corrosion reaction (reacting with water to generate hydrogen) on the negative active material. When the metal negative electrode 10 is used for, for example, a zinc-air battery, bismuth oxide, indium oxide, and tin oxide are preferably used as the conductive material 123. Note that the value of the exchange current density for a single element may vary depending on a cited literature. The above value is cited in "Journal of the Chemical Society of Japan, vol. 92, no. 3 (1971) pp. 99 to 114."

The binder 124 can be added to bind together particles of the active material particles 121 and the conductive material 123.

Figure 3:
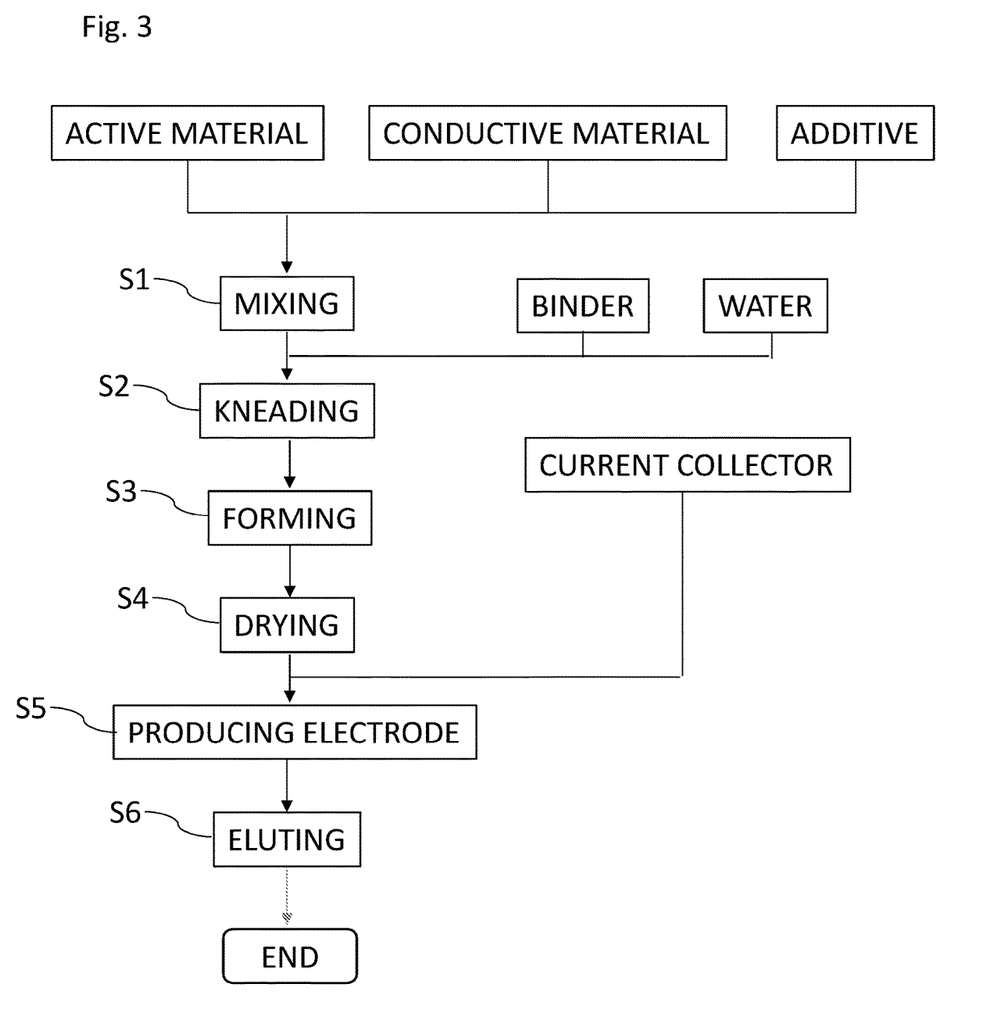
FIG. 3 illustrates a flowchart showing a manufacturing step of the metal negative electrode according to the first embodiment.

Described next is a schematic sequence of manufacturing the metal negative electrode 10 according to the first embodiment. FIG. 3 illustrates a flowchart showing a manufacturing step of the metal negative electrode 10. Note that the materials to be used and the manufacturing condition described below are an example, and are not limitative in all respects of the present disclosure.

(1) Mixing Step (S1)

Of the materials included in the active material layer 12, the active material particles 121, the conductive material 123, and the additive 122 are mixed together at a predetermined rate. Here, the mixture includes 100 parts by mass of zinc oxide as the active material particles 121, 1 part by mass of bismuth oxide as the conductive material 123, and 1 part by mass each of aluminum oxide and calcium oxide as the additive 122. Used for the mixing are such apparatuses as a mixer, a blender, a kneader, a bead mill, a ready mill, and a ball mill.

Moreover, either mixing technique may be utilized: the wet mixing which involves adding an organic solvent to the mixture, or the dry mixing which involves mixing without a fluid component.

(2) Kneading Step (S2)

A polytetrafluoroethylene (PTFE) dispersion and pure water to act as the binder 124 are added in predetermined amount to the mixed powder (the mixture of the active material particles 121, the conductive material 123, and the additive 122) prepared in the mixing step. The mixture is kneaded with a planetary mixer. Here, 8.3 parts by mass of the PTFE dispersion (PTFE: 60 wt % and water: 40 wt %) is added, and the pure water is added so that water/PTFE is 5.6 parts by mass. The planetary mixer kneads the mixture for five minutes at 45 rpm and then for 30 minutes at 90 rpm. The kneading is carried out with such apparatuses as a planetary mixer, a batch roll mill, an internal mixer, a kneader, a kneading extruder, a single or twin kneader.

(3) Forming Step (S3)

The kneaded product prepared in the kneading step is lumped together, and shaped with a rolling mill into a form of an electrode sheet having a predetermined thickness (approximately 3 mm). Preferably, the kneaded product is rolled twice or more. For example, the kneaded product is made thinner by 100 μm from 4 mm to 3.2 mm, and by 50 μm from 3.2 mm to 2.8 mm. Moreover, the kneaded product is to be rolled in one direction (forward and backward). During the rolling, the kneaded product is preferably rolled in another direction at 90° in relation to the previously rolled direction. In the forming, examples of techniques to be used include, other than using the rolling mill, pressing, extrusion, and cold isostatic pressing (CIP).

(4) Drying Step (S4)

The electrode sheet prepared in the forming step is vacuum-dried (e.g., at 40° C. for 18 hours), and cooled to a room temperature. Furthermore, the dried electrode sheet is cut into a predetermined size (e.g., 4.5 cm square) to make an electrode block. Note that, depending on a forming technique (e.g., when a mold is used for pressing), a predetermined size of mold can be used. Hence, the dried electrode sheet does not have to be cut into a predetermined size.

(5) Electrode Producing Step (S5)

The current collector 11 having a predetermined thickness (e.g., 0.1 mm) is sandwiched with the above electrode block. Then, the current collector 11 and the electrode block are pressed and integrated together. Here, a 5.6 mm-spacer is provided around the electrode block, and the spacer is pressed at a pressure of seven tons. Hence, the electrode block is shaped into the active material layer 12, such that the metal negative electrode 10 including the current collector 11 and the active material layer 12 is formed. Note that the active material layer 12 at this moment is in a state before the eluting step illustrated in FIG. 2A.

(6) Eluting Step (S6)

The metal negative electrode 10 assembled in the electrode producing step is immersed in an alkaline aqueous solution so that the additive 122 is eluted into the alkaline aqueous solution. Here, the alkaline aqueous solution is preferably pH>8, and more preferably pH>13. Moreover, examples of the alkaline aqueous solution include a sodium hydroxide aqueous solution, a potassium hydroxide aqueous solution, and a calcium hydroxide aqueous solution. Through this eluting step, the active material layer 12 is in the state after the eluting step illustrated in FIG. 2B.

Here, in the eluting step, a time period of one hour or longer and fifty hours or shorter is preferable for immersing the metal negative electrode 10, assembled in the electrode producing step, into an alkaline aqueous solution. Moreover, in the eluting step, the metal negative electrode 10 is immersed from a portion preferably away from the current collector 11. The metal negative electrode 10 is immersed into the alkaline aqueous solution from a portion away from the current collector 11, such that, in the active material layer 12, the void rate can be higher away from the current collector 11 than near the current collector 11. Such a feature can suppress the creation of passivation even in a portion, of the active material layer 12, away from the current collector 11 facilitating conduction of electrons, thus contributing to an increase in coulombic efficiency. In the eluting step, the metal negative electrode 10 may partially be immersed in the alkaline aqueous solution. For example, along the thickness of the active material layer 12, 30% or more of, more preferably 50% to 95% of, the active material layer 12 from the surface is immersed in the alkaline aqueous solution.

As can be seen, a significant feature of the metal negative electrode 10 according to the first embodiment is that, in the eluting step, the additive 122 is eluted so that, in the place where the additive 122 is previously found in the active material layer 12, the space 125 is defined. Specifically, the space 125 found in the metal negative electrode 10 after the eluting step is interpreted to be sized to contain particles as large as the additive 122 before eluted.

In a battery including the metal negative electrode 10, the electrolytic solution penetrates from a surface and a periphery of the active material layer 12 toward its center (near the current collector 11). Here, in the active material layer 12, the space 125 is defined after the additive 122 is eluted. Hence, even if the active material layer 12 is thick, the electrolytic solution penetrates through the space 125. As a result, a void in a center of the active material layer 12 is likely to be filled with the electrolytic solution. In a battery including the metal negative electrode 10, such a feature reduces current crowding and creation of passivation, thus contributing to an increase in coulombic efficiency and an improvement in battery property.

Moreover, in the manufacturing step of the metal negative electrode 10, the additive 122 remains until the final step; namely the eluting step. Hence, even if the rolling is carried out more often in the forming step and greater pressure is applied in the electrode producing step to increase the electrode density of the metal negative electrode 10, the space 125 in the metal negative electrode 10 after the eluting step can correspond to the size of the additive 122. The space 125 filled with the electrolytic solution makes it possible to provide sufficient conductive paths for ions. Hence, even if the metal negative electrode 10 is high in electrode density, an increase in ion resistivity can be reduced, improving the battery property.

As can be seen, the metal negative electrode 10 of the present disclosure allows the active material layer 12 to be thicker and higher in density along with an increase in the capacity of the battery. Moreover, in the metal negative electrode 10 of the present disclosure, the active material layer 12 is formed higher in density while allowing for appropriate penetration of the electrolytic solution in the active material layer 12 with the additive 122 eluted. Such a feature can increase coulombic efficiency of a battery provided with the metal negative electrode 10 of the present disclosure. Specifically, the metal negative electrode 10 may have a thickness ranging from 500 μm to 10 mm, and more preferably, from 1 mm to 6 mm. Furthermore, the active material layer 12 may have an electrode density ranging from 1.5 $g/cm^3$ to 3.5 $g/cm^3$, and more preferably, from 1.7 $g/cm^3$ to 3.1 $g/cm^3$. Moreover, a thickness ratio of the active material layer 12 to the current collector 11 may range from 1 to 1250 inclusive. The thickness of the active material layer 12 may be measured by any known technique. In addition, the size of the voids included in the metal negative electrode 10 depends on a particle size of the additive 122, and is assumed to be larger than the particle size; that is, ranging from 12 μm to 120 μm inclusive. The metal negative electrode 10 may have a void rate ranging from 40 to 75, and more preferably, from 50 to 70. An example of calculating the void rate of the metal negative electrode 10 may involve: measuring a volume V1 of a void in an active material, using a mercury porosimeter; calculating a volume V2, of the active material layer 12, measured based on the dimension of the active material layer 12; and dividing V1 by V2.

Second Embodiment

Described in a second embodiment is a more specific technique of the eluting step described in the first embodiment. The second embodiment involves assembling a battery using the metal negative electrode 10 processed until the end of electrode producing step and before the eluting step, and injecting an electrolytic solution into the assembled battery. Here, the additive 122 is eluted into the electrolytic solution injected into the battery, defining the space 125 in the active material layer 12 of the metal negative electrode 10. Moreover, in the case of the second embodiment, the electrolytic solution of a completed battery contains a component of the eluted electrolytic solution 122.

Note that examples of batteries capable of using the metal negative electrode 10 of the present disclosure include, as metal-air batteries, a zinc-air battery, a magnesium-air battery, an aluminum-air battery, and an iron-air battery. These batteries are not limited to the metal-air batteries whose positive electrode is an air electrode. Alternatively, for example, the air electrode may be replaced with a nickel positive electrode. Furthermore, if the metal negative electrode 10 is used for a secondary battery, the secondary battery may either have a bipolar or a tripolar electrode. These batteries can be provided in a known configuration, and thus the details thereof shall be omitted.

In the technique of this second embodiment, the additive 122 is eluted into the electrolytic solution injected into the battery. Hence, the additive 122 is made of a material to be eluted into an alkaline aqueous solution to be used as the electrolytic solution of the battery. Examples of the material include: a compound including an element in the second family of the periodic table among the elements acting as basic oxides; and/or a compound including an element in the thirteenth family of the periodic table among the elements acting as amphoteric oxides. Preferably, the examples of the material include an oxide, a hydroxide, a halide, a nitrate composition, and a sulfide including: an element in the second family of the periodic table among the elements acting as basic oxides; and/or an element in the thirteenth family of the periodic table among the elements acting as amphoteric oxides. More preferably, aluminum oxide and calcium oxide are used as the additive 122. The aluminum oxide to be used for the additive 122 can reduce self-corrosion caused by generation of hydrogen. Moreover, if the battery is a zinc-air battery and the calcium oxide is used as the additive 122, such a configuration affects a solubility of zinc ion, contributing to reduction in deformation of the active material layer 12. Furthermore, both the aluminum oxide and the calcium oxide can be used as the additive 122. If both of the aluminum oxide and the calcium oxide are included as the additive 122 in the active material layer 12, the aluminum oxide is preferably larger in average particle size than the calcium oxide. Aluminum oxide is less likely to dissolve in an alkaline aqueous solution than calcium oxide does. Hence, the calcium oxide begins to dissolve in the alkaline aqueous solution before the aluminum oxide. Thus, the average particle size of the calcium oxide is made smaller than that of the aluminum oxide so that the active material layer 12 can be provided with dense voids. The calcium oxide dissolves and the dense voids are defined, and then the aluminum oxide dissolves late. Hence, the dense voids are connected to voids defined when the aluminum oxide dissolves. Accordingly, the defined voids are likely to allow the electrolytic solution to penetrate into the active material layer 12 along the thickness. Moreover, if the active material particles 121 are a kind of zinc, the active material particles 121 are likely to be dense as they are away from the current collector 11 along the thickness of the active material layer 12. Hence, more particles of the aluminum oxide included in the active material layer 12 may preferably be found along the thickness of the active material layer 12 as the particles of the aluminum oxide are away from the current collector 11 and closer to the surface of the active material layer 12; whereas, less particles of the calcium oxide included in the active material layer 12 may preferably be found along the thickness of the active material layer 12 as the particles of the calcium oxide are away from the current collector 11 and closer to the surface of the active material layer 12.

In order for the active material layer 12 to be thoroughly impregnated with the electrolytic solution (an alkaline aqueous solution), the eluting step of the second embodiment may preferably involve (A) injecting the electrolytic solution under reduced pressure or (B) reducing the pressure after the electrolytic solution is injected. Moreover, the electrolytic solution may be separately injected twice or more in a predetermined amount. In particular, the technique (B) essentially involves separate injection to keep the air from being entrapped. The time period for the pressure reduction may preferably range from one minute to one hour in total because an excessive time period causes the water in the electrolytic solution to vaporize, and changes the concentration of the electrolytic solution. Furthermore, in the technique (B), an end of the metal negative electrode 10 immersed in the electrolytic solution releases the air, and the resulting bubbles adhere to the metal negative electrode 10. Hence, preferably, the metal negative electrode 10 may be periodically tilted and vibrated to remove the adhering bubbles.

The electrolytic solution is injected not to make direct contact with the metal negative electrode 10 to penetrate from a lower portion of the metal negative electrode 10. Moreover, the metal negative electrode 10 here is oriented so that the current collector 11 is vertically positioned. If the current collector 11 is horizontally positioned, the air below the current collector 11 is trapped by the current collector 11 and is likely to be held inside the metal negative electrode 10. Accordingly, the penetration of the electrolytic solution is insufficient, causing uneven elution of the additive 122. As long as the current collector 11 is vertically positioned, the metal negative electrode 10 (the end face of the metal negative electrode 10) may be oriented in any given direction.

After the electrolytic solution is injected into the battery, the battery is left still for a predetermined time period so that the additive 122 is eluted. If this time period is excessively short, the elution of the additive 122 is incomplete, and if the time period is excessively long, the assembly efficiency of the battery decreases. Preferably, the time period may range from five minutes to twenty four hours. Furthermore, the temperature of the electrolytic solution may be raised in the eluting step so that the time period for eluting the additive 122 can be reduced. Note that if the temperature is raised excessively, the active material particles 121 could also be eluted. Hence, the temperature needs to be set not to deteriorate the battery performance.

Third Embodiment

Described in a third embodiment is a more specific technique of the eluting step described in the first embodiment. The third embodiment involves assembling a battery using the metal negative electrode 10 processed until the end of the eluting step, and injecting an electrolytic solution into the assembled battery. Moreover, in the case of the third embodiment, the electrolytic solution of a completed battery does not contain a component of the eluted electrolytic solution 122.

The technique in this third embodiment uses the same material for the additive 122 and the same kind of solution to be used in the eluting step as the technique in the second embodiment does. That is, the solution can be an alkaline aqueous solution which is the same as the electrolytic solution, and the additive 122 can be made of a material to be eluted into the alkaline aqueous solution. In this third embodiment, however, the material of the additive 122 and the kind of the solution shall not be limited to such ones. The material and the kind of solution may be selected from among various ones.

The solution to be used in the eluting step may allow only the additive 122 to be eluted, and keep from affecting other features (the active material particles 121, the conductive material 123, the binder 124, and the current collector 11) of the metal negative electrode 10. For example, if the above solution is an aqueous solution ranging from pH 7 to pH 15, the additive 122 may be selected from an inorganic compound and an organic compound to be eluted into the aqueous solution. Examples of such an inorganic compound may include: an inorganic compound containing halide ions (e.g., NaCl, KCl, and KBr): an inorganic compound containing carbonate ions (e.g., $NaCO_3$); an inorganic compound containing sulphate ions (e.g., $MgSO_4$), and an inorganic compound containing hydroxide ions (e.g., NaOH and KOH). Moreover, an example of such an organic compound includes sucrose and glucose.

Fourth Embodiment

The above first to third embodiments describe, as an example, a configuration in which the active material layer 12 of the metal negative electrode 10 is a single layer. The present disclosure shall not be limited to such a configuration. As a metal negative electrode 10' in FIG. 4 shows, the active material layer 12 may be a multi-layer.

Figure 4:
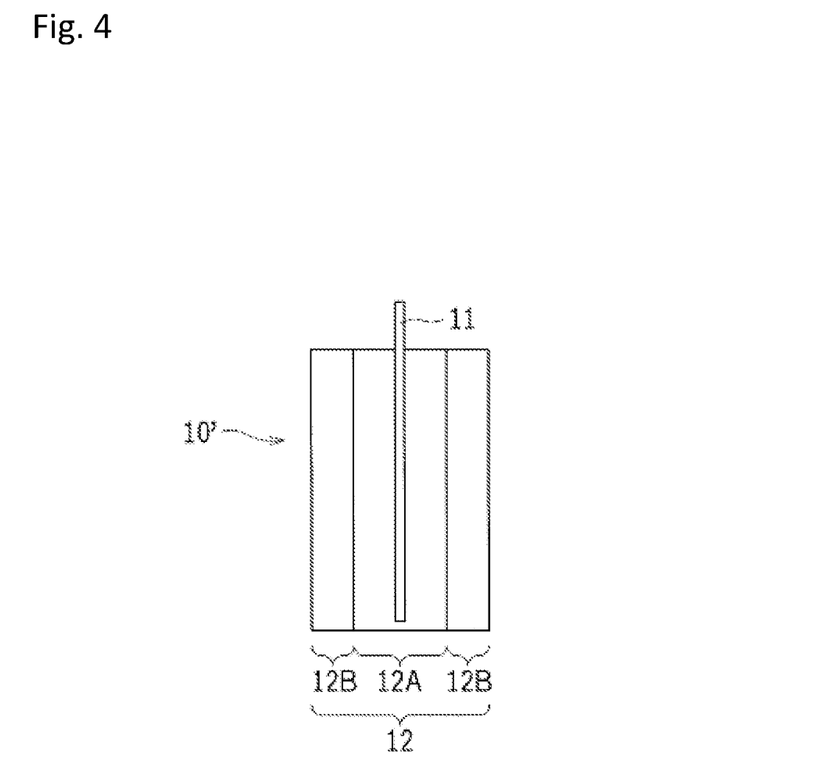
FIG. 4 schematically illustrates a cross-section of a configuration of a metal negative electrode according to a fourth embodiment.

In the metal negative electrode 10' illustrated in FIG. 4, the active material layer 12 is double-layered, including an inner layer 12A and an outer layer 12B arranged along the thickness of the active material layer 12. In this structure, the number of particles of the additive 122 in the inner layer 12A is larger than that of the additive 122 in the outer layer 12B. That is, in the metal negative electrode 10' after the eluting step in which the additive 122 has been eluted, the void rate of the inner layer 12A is larger than that of the outer layer 12B. Note that the inner layer 12A and the outer layer 12B are separately formed in the above mixing step, the kneading step, and the forming step. In the electrode producing step, the inner layer 12A and the outer layer 12B may be stacked together.

Such features can facilitate penetration of the electrolytic solution near the center of the active material layer 12, and reduce an increase in the void rate throughout the active material layer 12. The reduction of the increase in the void rate leads to an increase in a content of the active material particles 121 in the active material layer 12, contributing to an increase in capacity of the battery.

EXAMPLES

Described below in Table 1 are the results of experiments evaluating the metal negative electrode 10 of the present disclosure.

(How to Produce Metal Negative Electrode)

Examples 1 to 5 and Comparative Examples 1 to 3

As described in "Negative Electrode" of Table 1, the mixing step in Examples 1 to 5 and Comparative Examples 1 to 3 involved: adding 1 part by mass of bismuth oxide (the conductive material 123: Bismuth Oxide A produced by Taiyo Koko Co., Ltd.) and 0.1 to 3.0 parts by mass in total of aluminum oxide and calcium oxide (the additive 122: respectively Alumina A12 produced by Nippon Light Metal Company, Ltd. and Ultra-High Purity Calcia CSQ produced by Ube Material Industries, Ltd.) per 100 parts by mass of zinc oxide (the active material particles 121: Zinc Oxide Type 1 produced by Sakai Chemical Industry Co., Ltd.); and mixing the materials with 1-mm zirconia beads, using a ball mill for 18 hours at 15 rpm.

Here, 8.3 parts by mass of PTFE dispersion (the binder 124) was added to the mixture produced in the mixing step and including the active material particles, the conductive material, and the additive. Pure water was added to the mixture so that water/PTFE was 5.6 parts by mass. The mixture was kneaded with a planetary mixer. The planetary mixer kneaded the mixture for five minutes at 45 rpm and then for 30 minutes at 90 rpm.

The product kneaded with the planetary mixer was lumped together, and shaped with a rolling mill into a form of an electrode sheet having a thickness of 2.8 mm. The electrode sheet prepared with the rolling mill was vacuum-dried. The temperature and the time period for drying the electrode sheet were respectively set to 40° C. and 18 hours. The vacuum-dried electrode sheet was cut into a size of 4.5 cm square to prepare an electrode block.

A current collector having a thickness of 0.1 mm was sandwiched with the electrode block acting as the active material layer. A 5.6 mm-spacer was provided around the electrode block, and pressed at a pressure of seven tons. Hence, a metal negative electrode including the current collector and the active material layer was formed. The active material layer included the active material particles, the conductive material, and the additive.

The metal negative electrode including the current collector and the active material layer was immersed into potassium hydroxide of pH 14 for one hour. Here, the active material layer included the active material particles, the conductive material, and the additive. Accordingly, the metal negative electrodes in Examples 1 to 5 and Comparative Examples 1 to 3 were obtained.

was obtained. Next, the metal negative electrode in Examples 1 to 5 and Comparative Examples 1 to 3 as the working electrode, a polyolefin nonwoven fabric (6 cm×7 cm) as the separator, and a nickel electrode filled with nickel hydroxide as the counter electrode were stacked together and placed on an evaluation cell made of acrylic. As an electrolytic solution, a potassium hydroxide aqueous solution (pH=14) saturated with zinc oxide was used. A predetermined amount of the electrolytic solution was injected into the evaluation cell. Moreover, Hg/HgO was used as the reference electrode. The reference electrode was set to the evaluation cell to regulate a potential of the working electrode in charge and discharge.

Comparative Example 4

In Comparative Example 4, a metal negative electrode was obtained in the same production method as seen in Example 1 except that the additive was not mixed in the mixing step.

The same evaluation cell as that in Example 1 was used except that: the metal negative electrode in Comparative Example 4 was used as the working electrode: and an electrolytic solution to be used was a potassium hydroxide aqueous solution (pH=14), previously saturated with zinc oxide, with 1 part by mass of aluminum oxide and 1 part by mass of calcium oxide dissolved in the solution per 100 parts by mass of zinc oxide included in the metal negative electrode of Comparative Example 4.

(How to Evaluate)

The evaluation cells prepared in Examples 1 to 5 and Comparative Example 1 to 4 repeatedly underwent charge-discharge cycles under a current density of 30 mA/cm$^2$ and a depth of charge-discharge of 50%. Then, a capacity retention rate for 100 charge-discharge cycles was evaluated.

TABLE 1

| | Negative Electrode | | | | | | Electrolytic Solution | | |
| --- | --- | --- | --- | --- | --- | --- | --- | --- | --- |
| | Features | | | | | | | | |
| | Zinc Oxide | Bismuth Oxide | Aluminum Oxide | Calcium Oxide | PTFE Dispersion Unit | Water/ PTFE | Aluminum Oxide | Calcium Oxide | Capacity Retention Rate |
| | Parts By Mass | Parts By Mass | Parts By Mass | Parts By Mass | Parts By Mass | Parts By Mass | Parts By Mass | Parts By Mass | % |
| Example 1 | 100 | 1 | 1 | 1 | 8.3 | 5.6 | — | — | 99 |
| Example 2 | 100 | 1 | 0.1 | 0 | 8.3 | 5.6 | — | — | 93 |
| Example 3 | 100 | 1 | 2 | 0 | 8.3 | 5.6 | — | — | 90 |
| Example 4 | 100 | 1 | 0 | 0.1 | 8.3 | 5.6 | — | — | 94 |
| Example 5 | 100 | 1 | 0 | 2 | 8.3 | 5.6 | — | — | 96 |
| Comparative Example 1 | 100 | 1 | 0 | 0 | 8.3 | 5.6 | — | — | 63 |
| Comparative Example 2 | 100 | 1 | 3 | 0 | 8.3 | 5.6 | — | — | 70 |
| Comparative Example 3 | 100 | 1 | 0 | 3 | 8.3 | 5.6 | — | — | 74 |
| Comparative Example 4 | 100 | 1 | 0 | 0 | 8.3 | 5.6 | 1 | 1 | 60 |

Note that, in this experiment for evaluation, the zinc oxide had an average particle size of 0.6 μm, the bismuth oxide had an average particle size of 7 μm, the aluminum oxide had an average particle size of 55 μm, and the calcium oxide had an average particle size of 20 μm. In measuring the average particle sizes, a scanning electron microscope (SEM) was used to measure 100 particles, and an average particle size As seen in Table 1, Examples 1 to 5 show that the capacity retention rate after the 100 charge-discharge cycles was 90% or greater, confirming that advantageous battery property was obtained. That is, comparing Examples 2 and 4 in which 0.1 parts by mass of the additive 122 was added per 100 parts by mass of the active material particles 121 and Comparative Examples 1 and 4 in which the additive 122 was not added, the content of the additive 122 is preferably 0.1 parts by mass or greater per 100 parts by mass of the active material particles 121. Furthermore, comparing Examples 1, 3 and 5 in which 2 parts by mass of the additive 122 was added per 100 parts by mass of the active material particles 121 and Comparative Examples 2 and 3 in which 3 parts by mass of the additive 122 was added per 100 parts by mass of the active material particles 121, the content of the additive 122 is preferably 2 parts by mass or less per 100 parts by mass of the active material particles 121.

Moreover, Example 1 shows the capacity retention rate of 99%, which is higher than that in Examples 2 to 5. This rate suggests that a combination of various kinds of the additive 122 achieves more advantageous battery property.

Furthermore. Example 4 shows that the capacity retention rate is low (i.e., 60%), and that even if a material having the same component as the additive 122 is added to the electrolytic solution, the battery property does not improve.

The present disclosure shall not be limited to the embodiments described above, and can be modified in various manners within the scope of claims. The technical aspects disclosed in different embodiments are to be appropriately combined together to implement an embodiment. Such an embodiment shall be included within the technical scope of the present disclosure.

CROSS REFERENCE TO RELATED APPLICATION

The present application claims priority to Japanese Patent Application No. 2017-215808, filed Nov. 8, 2017, the contents of which are incorporated herein by reference in its entirety.

The invention claimed is:

1. A negative electrode, for a battery using an alkaline aqueous solution as an electrolytic solution, including metal as a negative active material, the negative electrode comprising
    an active material layer including an additive and active material particles including a zinc-containing compound,
    the additive comprising particles with an average particle size larger than an average particle size of the active material particles, and
    the additive further comprising at least one selected from a group consisting of a compound including an element in a second family of a periodic table among elements acting as basic oxides and another compound including an element in a thirteenth family of the periodic table among elements acting as amphoteric oxides, wherein
    the additive contains ranges from 0.01 parts by mass to 2.8 parts by mass inclusive per 100 parts by mass of the active material particles,
    a thickness of the negative electrode for the battery is 500 µm to 10 mm,
    the additive further comprises: a first additive; and a second additive comprising particles with an average particle size smaller than an average particle size of particles of the first additive,
    the second additive is more dissolvable in the alkaline aqueous solution than the first additive,
    the first additive is aluminum oxide, and
    the second additive is calcium oxide.

2. The negative electrode according to claim 1, wherein the first additive has an average particle size ranging from 30 µm to 100 µm, and the second additive has an average particle size ranging from 10 µm to 30 µm.

3. The negative electrode according to claim 1, wherein the active material layer includes a plurality of active material layers stacked together along a thickness of the active material layer, the plurality of active material layers including an outer active material layer and an inner active material layer along the thickness, and the outer active material layer being larger in number of particles than the inner active material layer.

4. The negative electrode according to claim 1, further comprising
    a current collector provided in a center along a thickness of the active material layer.

5. The negative electrode according to claim 4, wherein a thickness ratio of the active material layer to the current collector ranges from 1 to 1250 inclusive.

6. A battery comprising
    the negative electrode according to claim 4.

7. The negative electrode according to claim 1, wherein the thickness of the negative electrode for the battery is 1 mm to 6 mm.

* * * * *